April 20, 1937.  H. R. CROWTHER ET AL  2,077,464

GAME APPARATUS

Filed Nov. 10, 1932   13 Sheets-Sheet 1

INVENTORS
HARRY R. CROWTHER
SYLVANUES W. HAWKINS
BY Ely Barrow
ATTORNEYS

April 20, 1937.  H. R. CROWTHER ET AL  2,077,464
GAME APPARATUS
Filed Nov. 10, 1932     13 Sheets-Sheet 3

INVENTORS
HARRY R. CROWTHER
SYLVANUES W. HAWKINS
BY
ATTORNEYS

April 20, 1937. H. R. CROWTHER ET AL 2,077,464
GAME APPARATUS
Filed Nov. 10, 1932   13 Sheets-Sheet 4
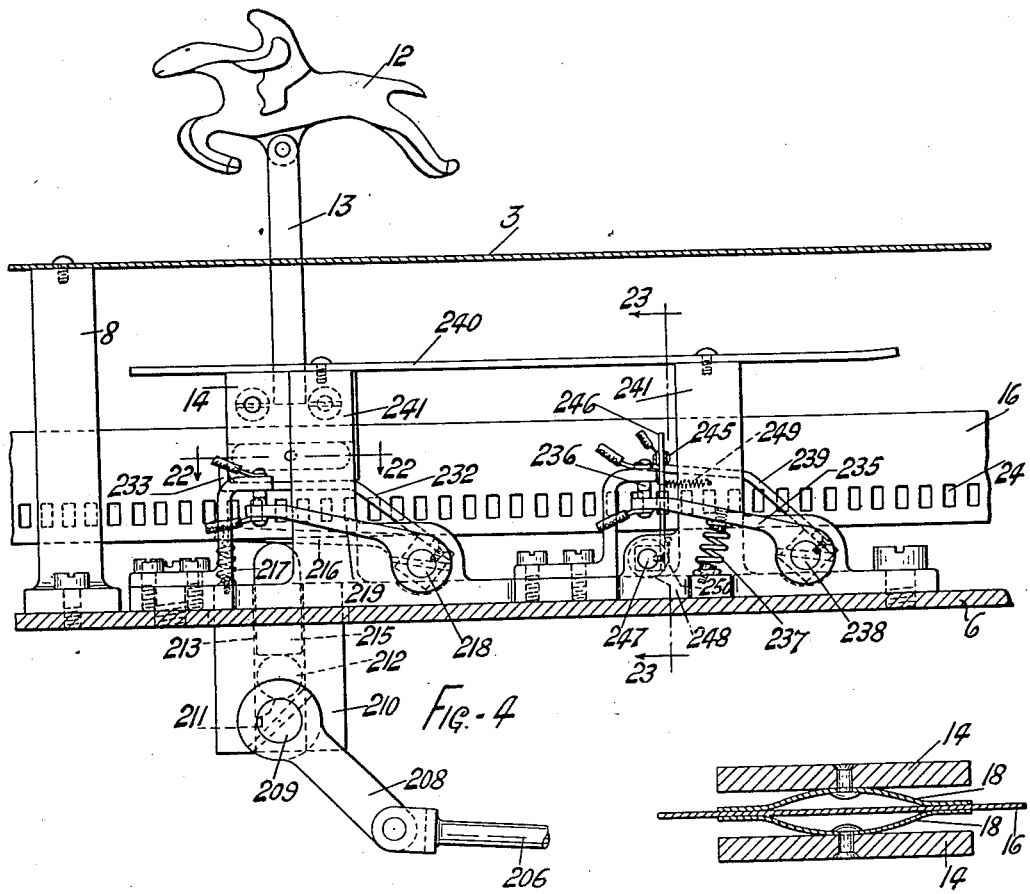
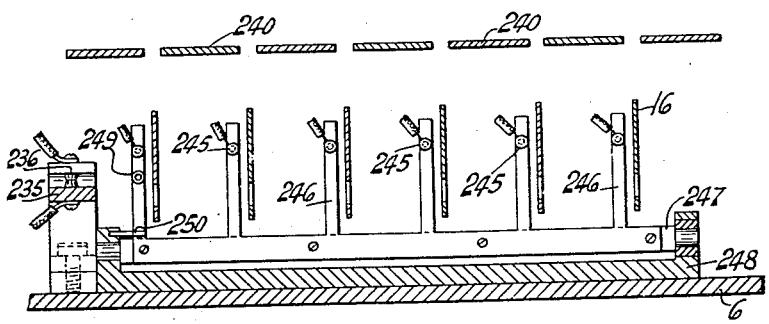
INVENTORS
HARRY R. CROWTHER
SYLVANUES W. HAWKINS
BY Ely Barrow
ATTORNEYS

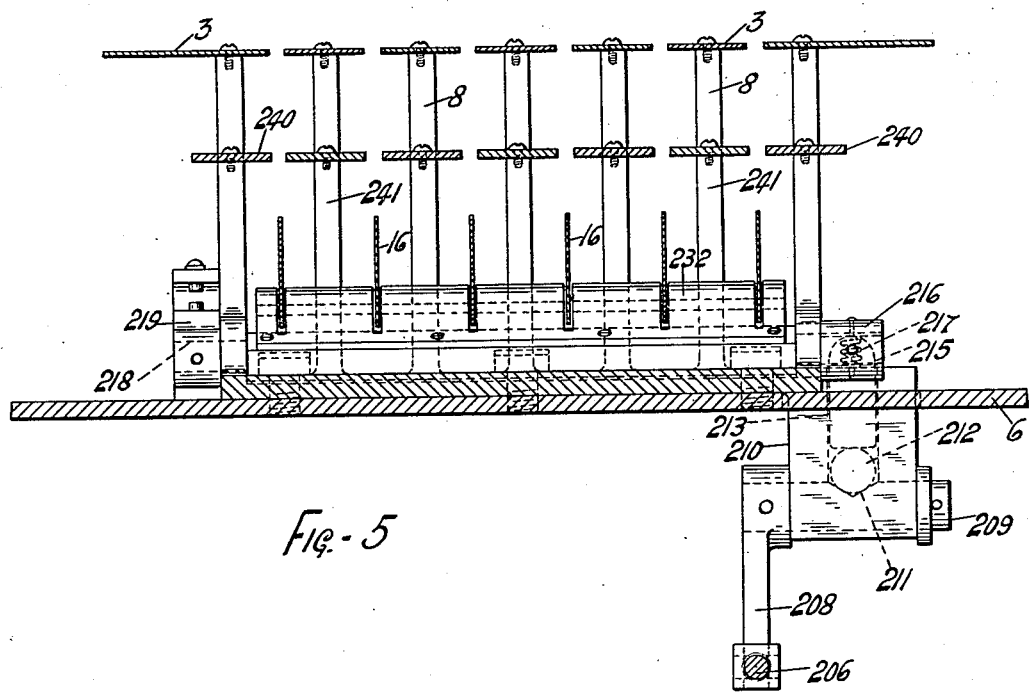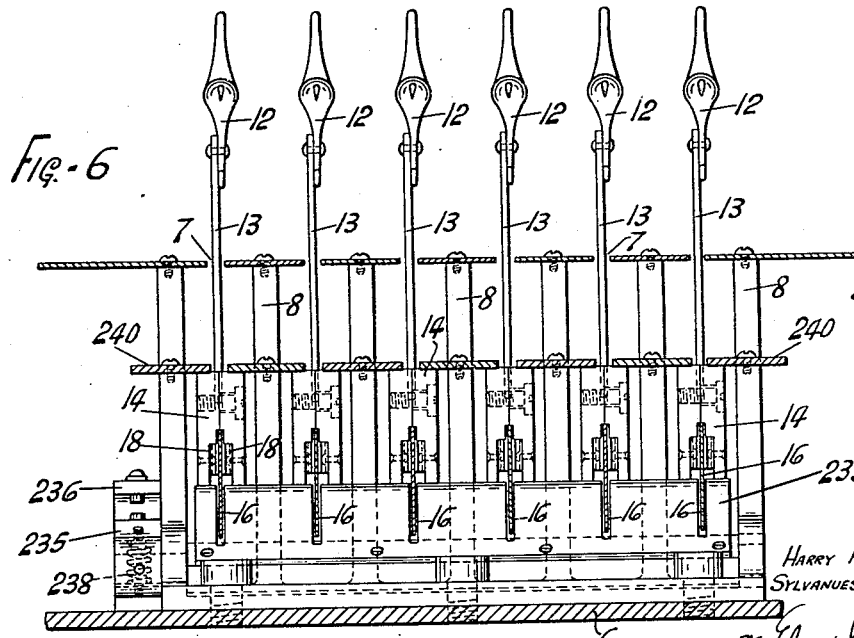

April 20, 1937.   H. R. CROWTHER ET AL   2,077,464
GAME APPARATUS
Filed Nov. 10, 1932   13 Sheets-Sheet 6

INVENTORS
HARRY R. CROWTHER
SYLVANUES W. HAWKINS
BY Ely Barrow
ATTORNEYS

April 20, 1937.   H. R. CROWTHER ET AL   2,077,464
GAME APPARATUS
Filed Nov. 10, 1932   13 Sheets—Sheet 9

INVENTORS
HARRY R. CROWTHER
SYLVANUES W. HAWKINS
BY Ely & Barrow
ATTORNEYS

April 20, 1937.　　H. R. CROWTHER ET AL　　2,077,464
GAME APPARATUS
Filed Nov. 10, 1932　　13 Sheets-Sheet 10

INVENTORS
HARRY R. CROWTHER
SYLVANUES W. HAWKINS
ATTORNEYS

April 20, 1937. H. R. CROWTHER ET AL 2,077,464
GAME APPARATUS
Filed Nov. 10, 1932 13 Sheets-Sheet 11
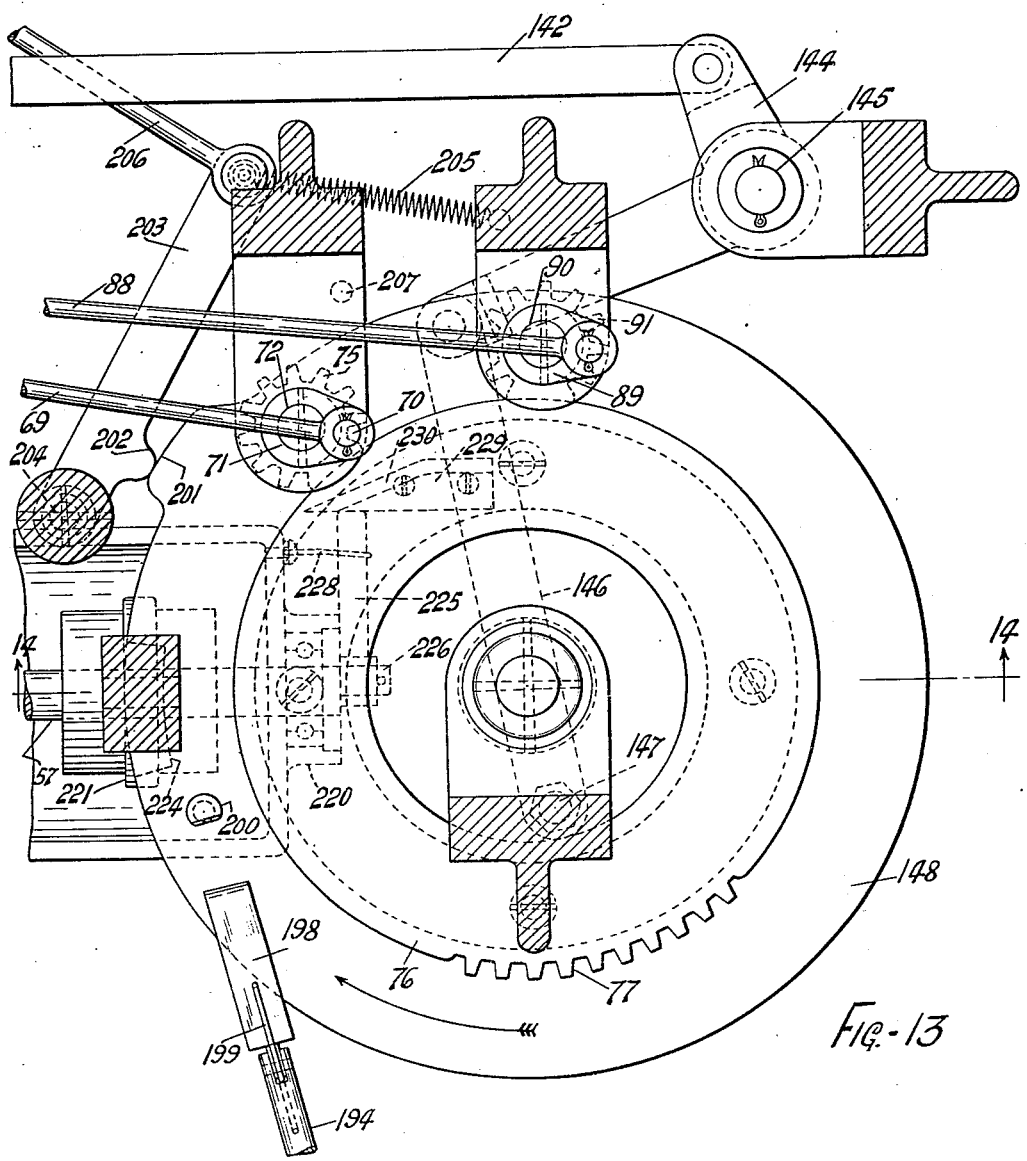
FIG.-13
FIG.-26
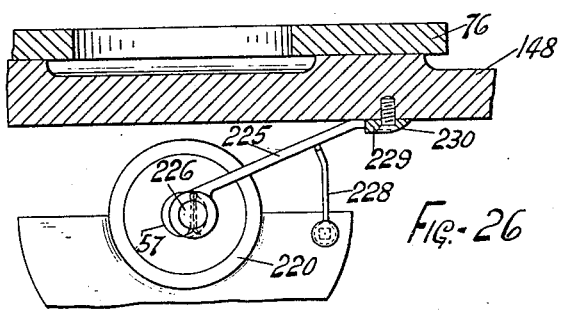
INVENTORS
HARRY R. CROWTHER
SYLVANUES W. HAWKINS
BY Ely Barrow
ATTORNEYS

Patented Apr. 20, 1937

2,077,464

UNITED STATES PATENT OFFICE 2,077,464

GAME APPARATUS

Harry R. Crowther and Sylvanues W. Hawkins, Cuyahoga Falls, Ohio

Application November 10, 1932, Serial No. 642,056

32 Claims. (Cl. 273—86)

The present invention relates to game apparatus in which is provided a mechanism, entirely and completely out of control of the operator, which simulates a race in which the result is governed wholly by chance. While the invention and the apparatus constituting the invention is preferably in form similar to a horse race, the invention may take any suitable or desirable form.

The apparatus is coin controlled and operated so that on the insertion of a coin, the apparatus will start automatically and will continue until one of the objects, in the case shown, one of the horses, reaches a finish line, whereupon the apparatus stops and the results can be observed.

In forms of the invention wherein a horse race is reproduced, several horses, here shown as six in number, are carried about an oval track. What may be termed as the basic speed at which each object or horse moves is governed for the respective objects with reference to the length of the path each horse is to follow, so that if all things were equal the horses would all start at a given point and reach the finish line simultaneously. As the outside horses move over a greater distance than the inside horses, the drive mechanism for the several horses is carefully graduated to give equivalent basic speeds to accomplish this result. In the mechanism of the apparatus, there is included means to vary the basic speeds at which the individual horses travel, and this means consists in a plurality of control devices which are mixed and distributed in such manner that it is impossible to tell beforehand which horse will be driven at the required increment over the speed of the other horses so that it will reach the finish line first.

The particular control mechanism illustrated herein, and which has operated effectively in all cases, consists of a series of balls of graduated sizes, equal to the number of horses. During the operation of the apparatus, these balls are mixed indiscriminately and when placed in proper operative position, they control the speed of the belts upon which the horses move. Preferably two sets of balls are employed, one being in position to effect the variation in speed while the other set is delivered to a mixing device and thence to a station from which they are moved into position to control the next race. As each race is completed, the set of balls which controlled that race is held in position until the next race is started. The balls then drop out of control position and the other set moves into position during the interval in which the horses move to the barrier or starting line. The first mentioned set is then passed through the mixing device and delivered into ready position.

As the speed at which the horses move is different due to their position on the track, and as each horse is also subjected to the speed variation due to the control means or balls, the horses will seemingly overtake and pass one another during the race in a lifelike manner, and this effect will be heightened by the movement of the horses around the turns in the track. Horses will apparently lag behind at the turns and then due to their different basic speeds which are fixed as described, they will seemingly overtake other horses.

When one horse of the group reaches the finish line, the apparatus stops and the position of the horses can be ascertained. This leaves the horses after each race in varied positions. When a coin is inserted and the race started, the horses move up to a starting line or barrier where they stop in alignment for a sufficient interval to allow the rearmost horse from the last race to move into position in a straight line across the track at the barrier. When a sufficient interval has elapsed, all of the horses are released at the same time and the race begins.

The mechanism is so arranged that no "dead heats" will result and while certain horses may be or appear to be abreast at times during the races, they will always be at different distances from the finish line at the end of the race. Not only will the leading horse be sufficiently ahead of the others so that the winner can be easily determined, but the "place" and "show" horses will also clearly appear.

The various permutations or differences in results are limited only by the number of horses or other objects in the apparatus, and as the control mechanism for determining the sequence of the horses at the finish line is entirely out of control and unpredictable in advance, it will be seen that the apparatus offers a lively and interesting form of amusement. The action closely resembles an actual horse race and will be exciting and amusing.

With the apparatus shown, the main purpose of the invention is to provide a mechanism of this type in which the results are entirely governed by chance. As ancillary to such purpose, the mechanism includes means for lighting the track while a race is in progress, coin control mechanism which is both foolproof and proof against vandalism, and a realistic representation of a race or contest. The apparatus may be embellished with miniatures of stands and other appurtenances to a race track.

The mechanism and apparatus which are shown in considerable detail herein, in order to illustrate the best mode in which the invention is to be employed, have been successfully demonstrated and used, being the subject of exhaustive experimentations to determine that the results are wholly controlled by chance and cannot be predicted in advance, nor can the mechanism be tampered with to control the race. Many of the details and specific forms of the various parts may be varied or modified within the scope of the invention, it being intended that the scope of the claims appended hereto shall cover such variations and changes as may be permissible within the scope of the invention. The invention is, therefore, not to be construed as confined to the device shown here, as it is possible to carry out the main purpose and object of the invention in other specific embodiments. For example, the oval form of track may be replaced by a straight track, but the form shown is preferred. The specific control means and the distributing device are not essential and may be varied within the scope of the invention, and the details of the mechanism may be the subject of improvements or alterations. The objects are referred to as "horses" for the sake of convenience throughout the specification and claims, it being understood that such term is used in a general sense for any object which takes part in the race.

In the drawings in which the best known or preferred form of the invention is shown, the apparatus is shown for six horses carried upon belts or tapes about an oval track. In the views the horses are shown as they appear at the finish of a race, and the horses, numbered 1 to 6 inclusive, from the inside of the track, are shown in the following positions. Horse No. 1 is at the finish line and is followed by horses 2, 5, 3, 6 and 4 in the order named. This showing of the parts is preserved in all of the other views except as noted.

In the drawings:

Figure 4 is a similar view showing the horse moved forward in contact with the barrier;

Figure 5 is a vertical section across the track on the line 5—5 of Figure 3, the barrier switch being open;

Figure 6 is a section on the line 6—6 of Figure 3 showing all of the horses across the track as they are at the finish and while the apparatus is idle;

Figure 13 is an enlarged detail view of the disk wheel which is operated to start the machinery in motion;

Figure 2:
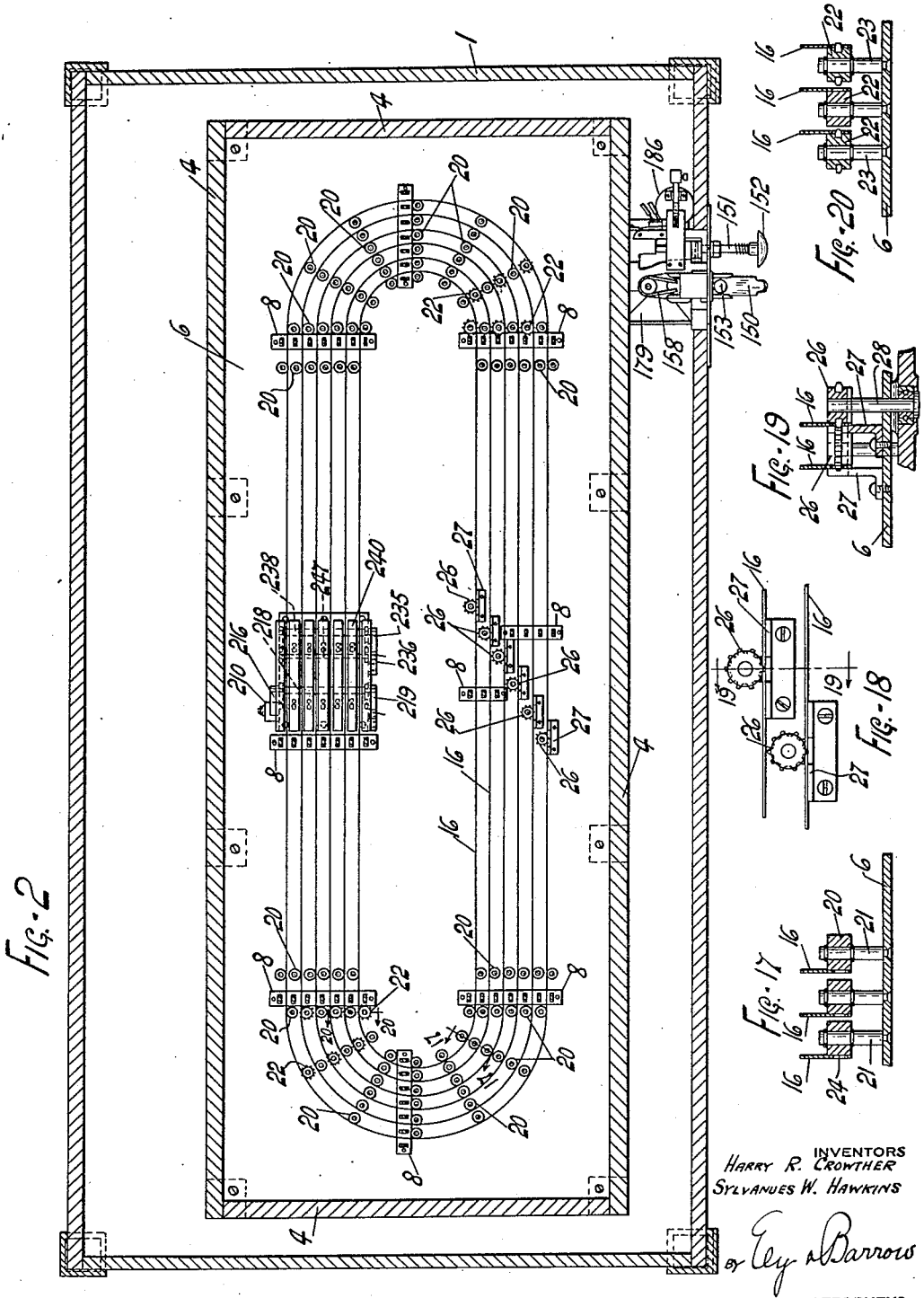
Figure 2 is a horizontal section taken immediately below the upper deck, exposing the barrier and finish switches.
Figure 3:
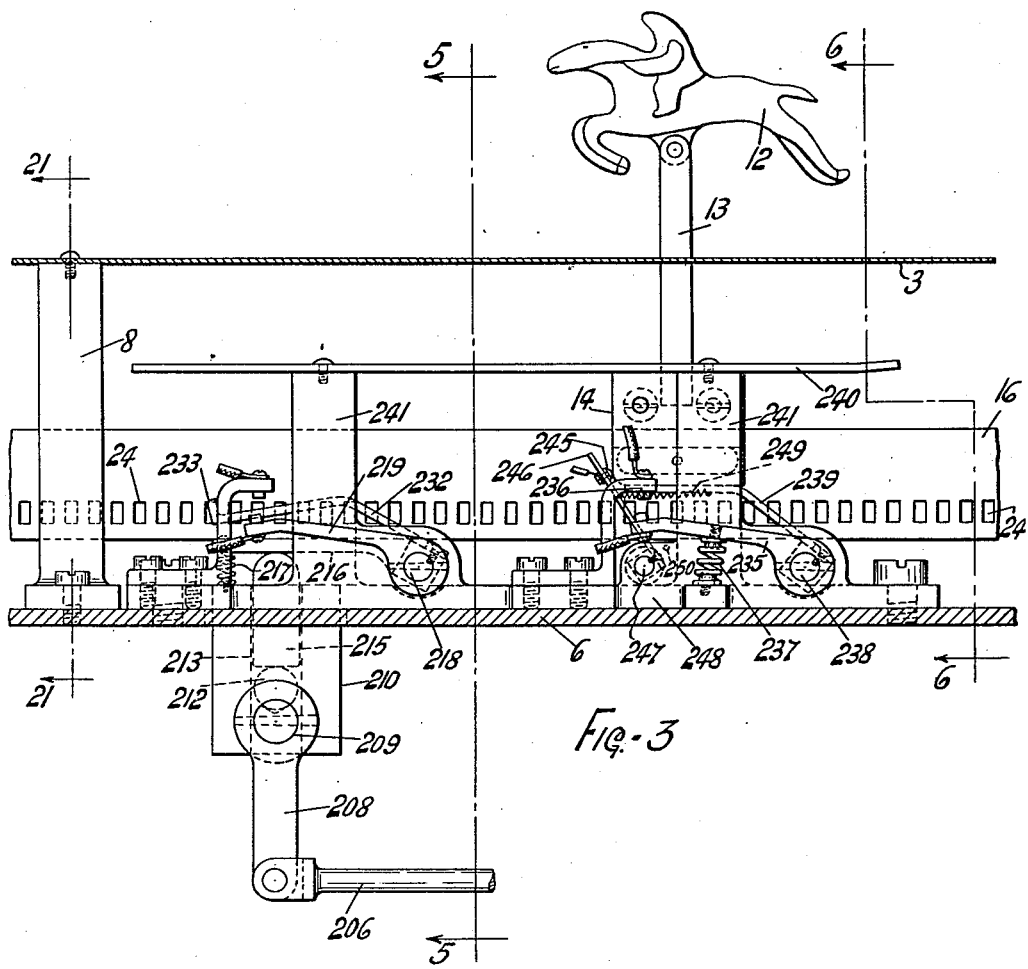
Figure 3 is an enlarged vertical section and elevation showing one horse at the finish line and in position where it opens the switch to stop the race.
Figure 21:
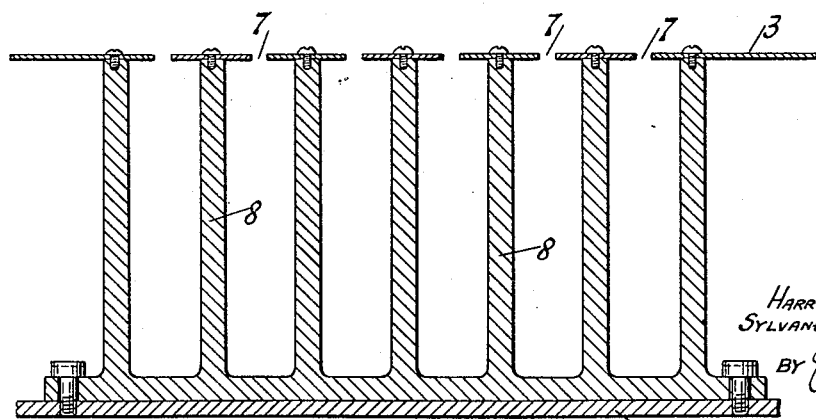
Figure 9:
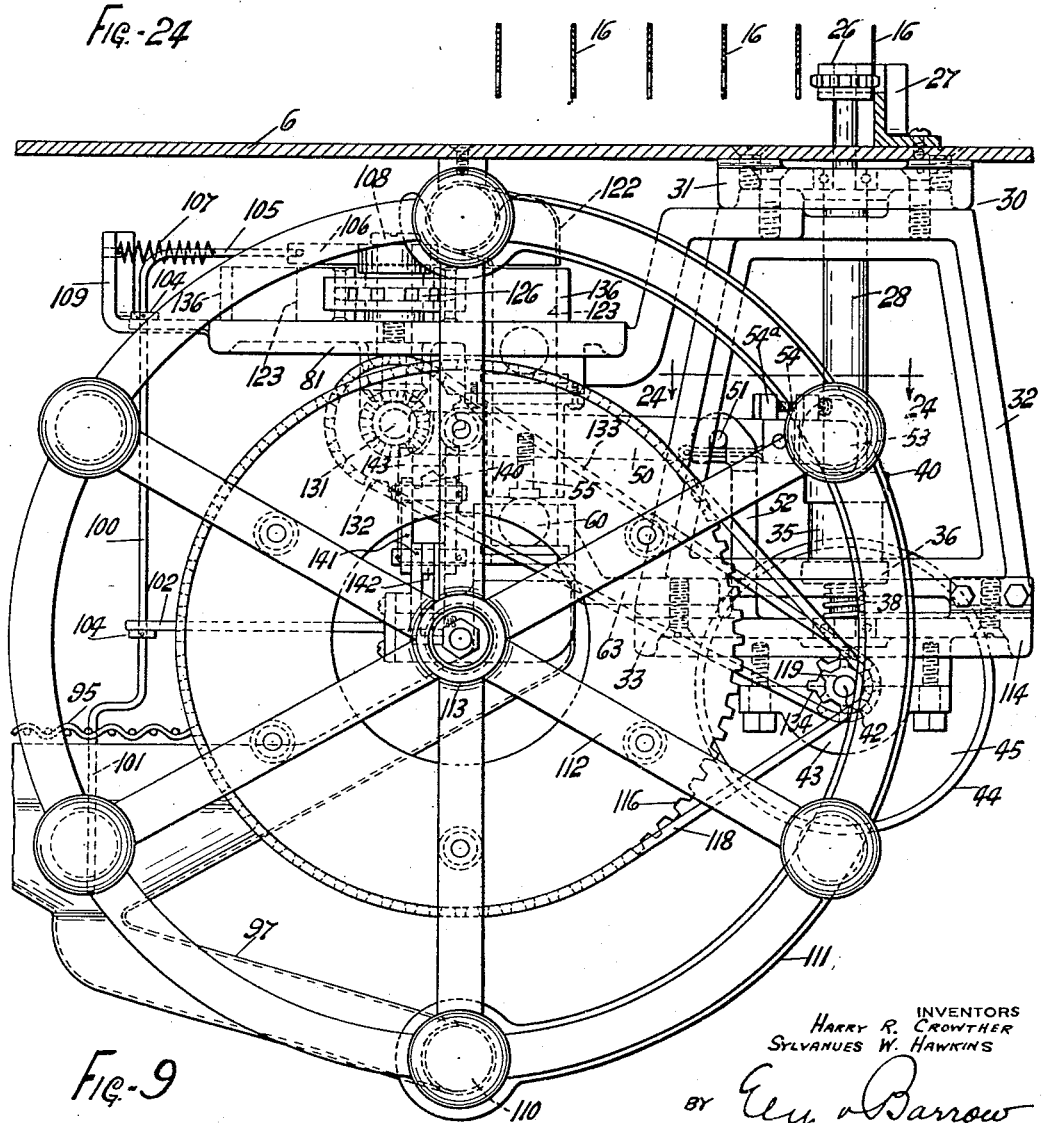
Figure 9 is an elevation of the pick-up wheel, which operates to raise the control devices or graduated balls after they are released at the beginning of a race to make way for the control balls for the race about to begin.
Figure 12:
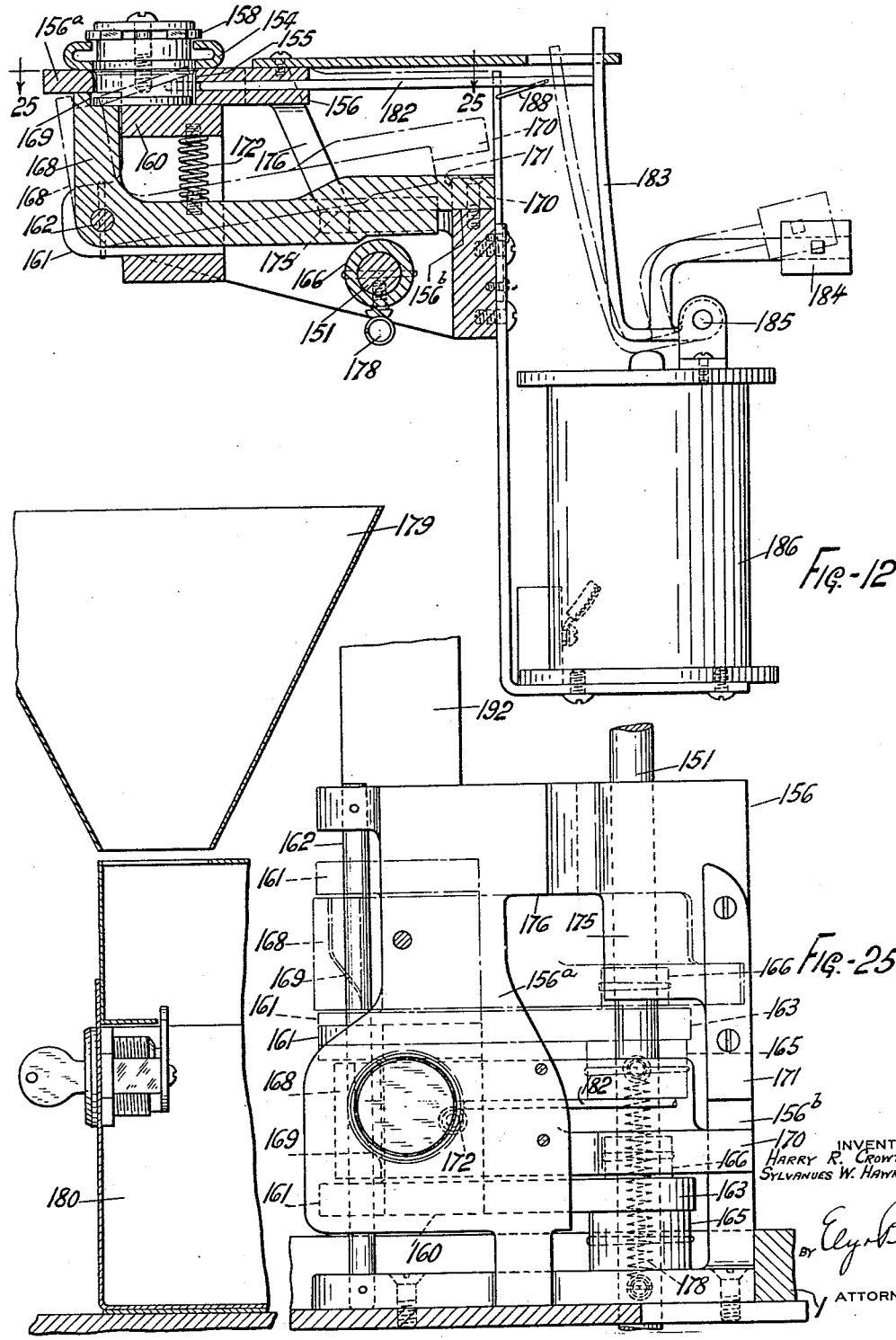
Figure 12 is an enlarged section on the line 12—12 of Figure 7 showing the coin control device.
Figure 14:
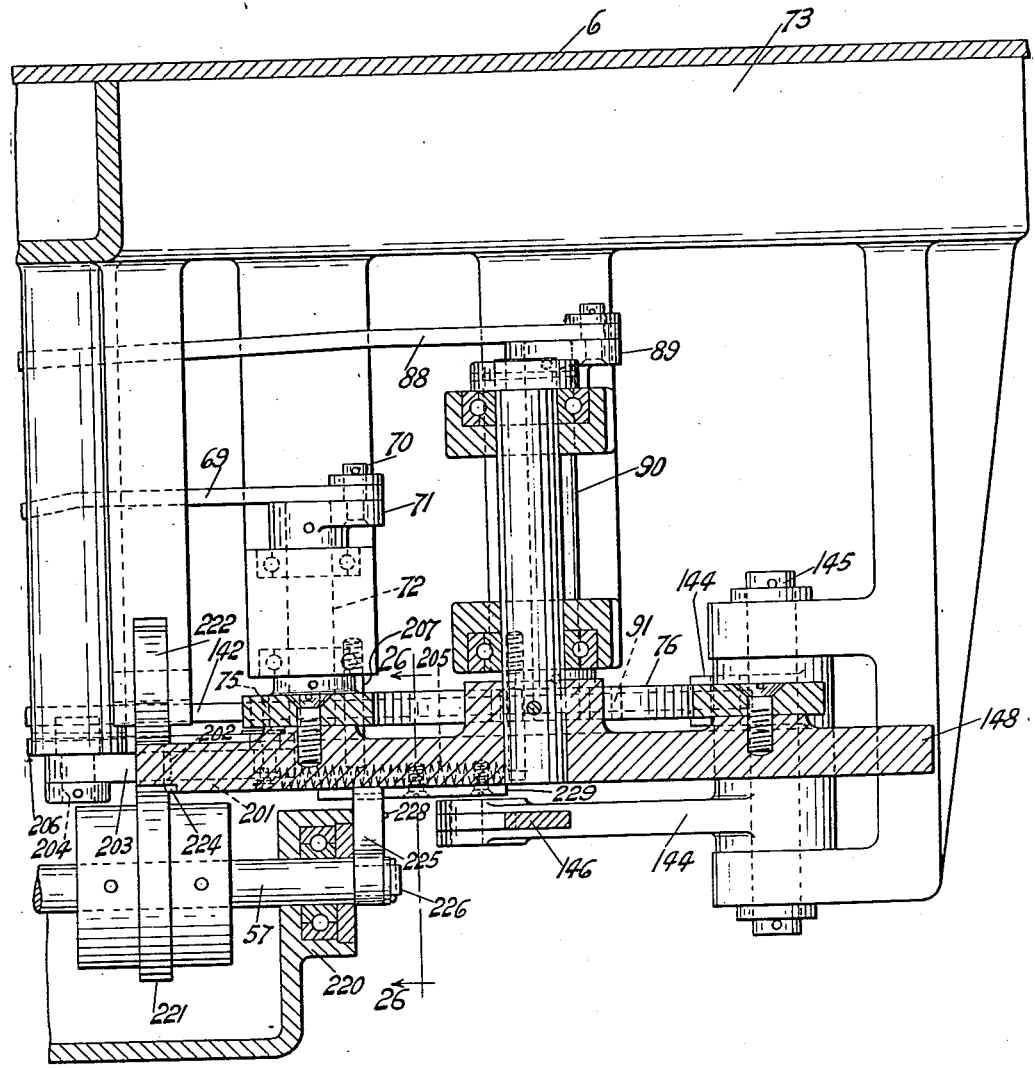
Figure 14 is a vertical section of the disk wheel and associated devices on the line 14—14 of Figure 13.
Figure 15:
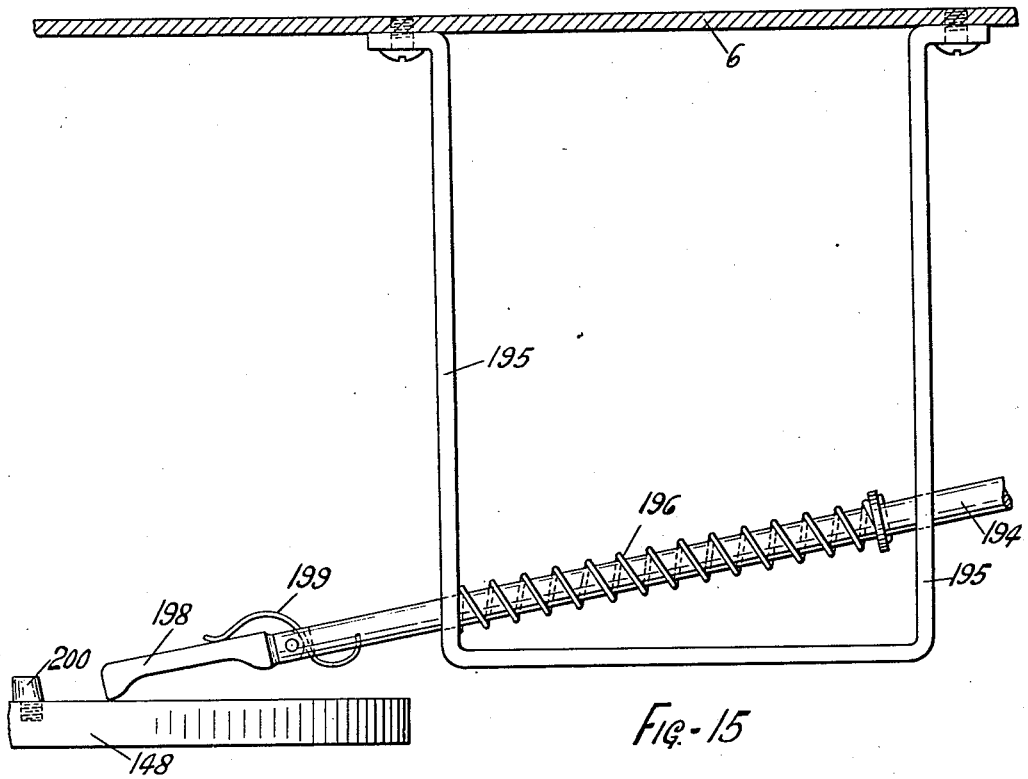
Figure 15 is an enlarged view on the line 15—15 of Figure 7 showing the disk wheel pusher.

Referring now to the smaller views:

Figures 17 to 20 inclusive (Sheet 2) are detail views of the tape or belt driving devices, Figure 17 being a section through the guide rolls on the line 17—17 of Figure 2; Figure 18 is a plan of two of the drive pinions; Figure 19 is a section on the line 19—19 of Figure 18; and Figure 20, a section through guide pinions on the line 20—20 of Figure 2;

Figure 21 (Sheet 3) is a detail of the track support on the line 21—21 of Figure 3;

Figure 22 (Sheet 4) is a detail of the carrier on the line 22—22 of Figure 4;

Figure 23 is a detail of the switch for announcing the winning horse, the view being a section on the line 23—23 of Figure 4;

Figure 24 (Sheet 8) is a section on the line 24—24 of Figure 9 showing the adjusting mechanism on a speed control lever;

Figure 25 is a section on the line 25—25 of Figure 12 showing in enlarged detail the coin control mechanism; and Figure 26 (Sheet 11) is a detail of the disk wheel on the line 26—26 of Figure 14.

In order to describe conveniently the construction and operation of the apparatus, the detailed exposition of the preferred mechanism will be divided into several heads or subjects which will be treated as much as possible under separate headings. It may be necessary that certain of these subjects overlap, but for the purposes of the case we will consider them in the order as they appear.

*The track, horses and driving mechanism*

The apparatus is conveniently arranged in a cabinet or case 1, the upper side of which is closed by a swinging lid or cover 2 which may be locked and has a glass plate arranged therein through which the track may be viewed. Within the cabinet is a deck 3 which represents the track having six oval courses or slots 7 through which the carriers for the horses move. The operating mechanism is enclosed by the walls 4 and covered by a plate or bed 6. The plate or top deck 3 is supported at intervals by brackets 8 from the bed 6. The interior of the cabinet may be decorated with any paraphernalia in miniature to resemble a race track and is arranged to be lighted from lamps 9 which are only lighted while the motor is in operation, and lamps 9a which are operated by an outside switch at the option of the operator. A series of lights baring the numbers corresponding to the horses may be added so that the winning horse is indicated by the glowing of the corresponding light. These lights are indicated at 10.

The objects or horses are shown as six in number, indicated by the numerals 12, and are designated with numbers or letters. Each horse is carried upon a vertical blade or bar 13 which projects through one of the slots 7 and is fastened into the upper side of a block or carriage 14 made of two facing members open on its under side to straddle the appropriate driving belt or tape 16. These tapes are thin bands or ribbons set on edge, as will be described, the carriages 14 having a frictional contact with the tapes so that when the horses are moved to the barrier and stopped for transverse alignment, the tapes may continue to move. The friction is sufficient, however, to move each carriage without slippage when free of the barrier. To secure the proper frictional contact, the inside of the fork on each carriage is provided with the oppositely bowed springs 18 which bear against the sides of the tape 16.

The tapes are arranged as shown in Figure 2 in parallel courses beneath the slots 7, being guided at the turns by idler rolls or pulleys 20 mounted on pins 21 from the bed 6 and also by idler sprockets 22 mounted on pins 23 at spaced points. The tapes are metal ribbons having perforations 24 near the base thereof engaging the sprockets 22 previously referred to and also drive sprockets 26 which are arranged in an oblique row across the bed of the machine. Opposite the drive sprockets are arranged backing plates 27 which hold the tapes in driving engagement with the sprockets 26, the plates being apertured as shown. Each driving pinion is keyed to a vertical shaft 28, passing through the bed 6 and supported in bearings in a bracket 30 attached to the deck. The bracket 30 comprises a plate 31 secured beneath the bed 6 and extending across the diagonal row of drive shafts, downwardly extending frames 32 attached to the plate 31, and a lower cross plate 33 attached to the frames 32. Near its lower end each shaft 28 is formed with a key to which is slidably keyed a sleeve 35, the lower end of which is formed with an enlarged friction driving surface 36. Beneath the sleeve is located a bearing ring 37 by which the sleeve is forced upwardly from the expansive force of the coil spring 38 between the ring 37 and the lower plate 33. The upper end of the sleeve is surmounted by a ball thrust bearing 40.

The vertical shafts 28 are driven from the common driving shaft 42 which extends beneath the row of shafts 28 and in alignment therewith, being supported in bearings 43 on the bracket 30. For each member 36 there is provided on the shaft 42 a driving disk 44 having a rubber wearing face 45 with which the surface 36 contacts, the several disks 44 being keyed on the shaft 42 and forced into driving contact with the pulleys 36 by expansion springs 48 surrounding the shaft and held by fixed collars 49. In order to secure the proper variations in speed of the several belts and horses to compensate for the different lengths of their several courses, or what has been termed above the "basic speed" of each horse, the driven members 36 are of different diameters, that connected to the inside or rail horse being largest to compensate for the short track, and the several members 36 decreasing in diameter in regular gradations to the smallest or outside horse. If all of the members or driven disks 36 were located at the same distance from the center of the shaft 42, the horses would start and finish together. In the particular order in which the race depicted was run, however, it will be seen that the driven disks or pulleys 36, shown in Figure 8, correspond with respect to their respective distance from the axis of the shaft 42 as the order in which the horses are shown at the finish in Figure 1. The distances at which the several driven disks are placed on the driving disks 44 are controlled by the several balls referred to in the opening portion of the specification and will be described more in detail in that portion of the specification referred to as the "Speed control mechanism." It will be sufficient to state at this point that the expansion of the spring 38 which tends to elevate each driven pulley 36 and thus move it outward on the disk 44 is resisted and limited by a lever 50 pivoted on a pin 51 extending along the bracket and supported in a bearing on an arm 52 rising from the plate 33. The end of the lever 50 adjacent the shaft 28 is provided with a fork 53 which embraces the shaft and has a rounded under side resting upon the thrust bearing 40. For fine adjustment of the lever, the fork is held in fixed position by screw 54 (Figure 24) bearing against a lug 54ª. The opposite end of the lever 50 is provided with an adjustable bearing pin or foot 55 which rests upon the appropriate ball 60. It will thus be seen that the position of the driven pulley 36 on the disk 44 is governed by the size of the ball 60 and thus the variation in running time of the several horses is controlled by the distribution of the various sizes of balls 60. The mechanism is capable of accurate adjustment for basic speeds through the adjusting screw 54 and the adjustable pin 55.

The shaft 42 is connected by a flexible coupling 56 to a shaft 57 which is driven through suitable worm reduction gearing from a motor 58 suspended in a casing 59 from the under side of the bed 6.

*Speed control mechanism*

As outlined in the earlier portion of the specification, the speed of the various horses, by which is meant the variations from the basic speeds referred to, is controlled by a set of differential speed control devices which are subject to a distributing device capable of indiscriminate mixing in the machine. These speed control devices are the two sets of balls, one of which has been referred to as 60. Each set consists of six balls, corresponding to the number of horses, and the balls are graduated in size. When the machine is at rest, one set of balls is located in its formerly operative position beneath the several pins or feet 55, while the other set is in ready position so as to be brought into operative position for the next race. When the coin is inserted and the machine started in operation, one of the first acts is to raise the control levers 50, discharge the balls from the former race, and release the second set of balls in position to be located beneath the feet which are then lowered and the speed of the tapes is thus controlled. These operations take place during the interval in which the horses move up to the barrier.

Figure 1:
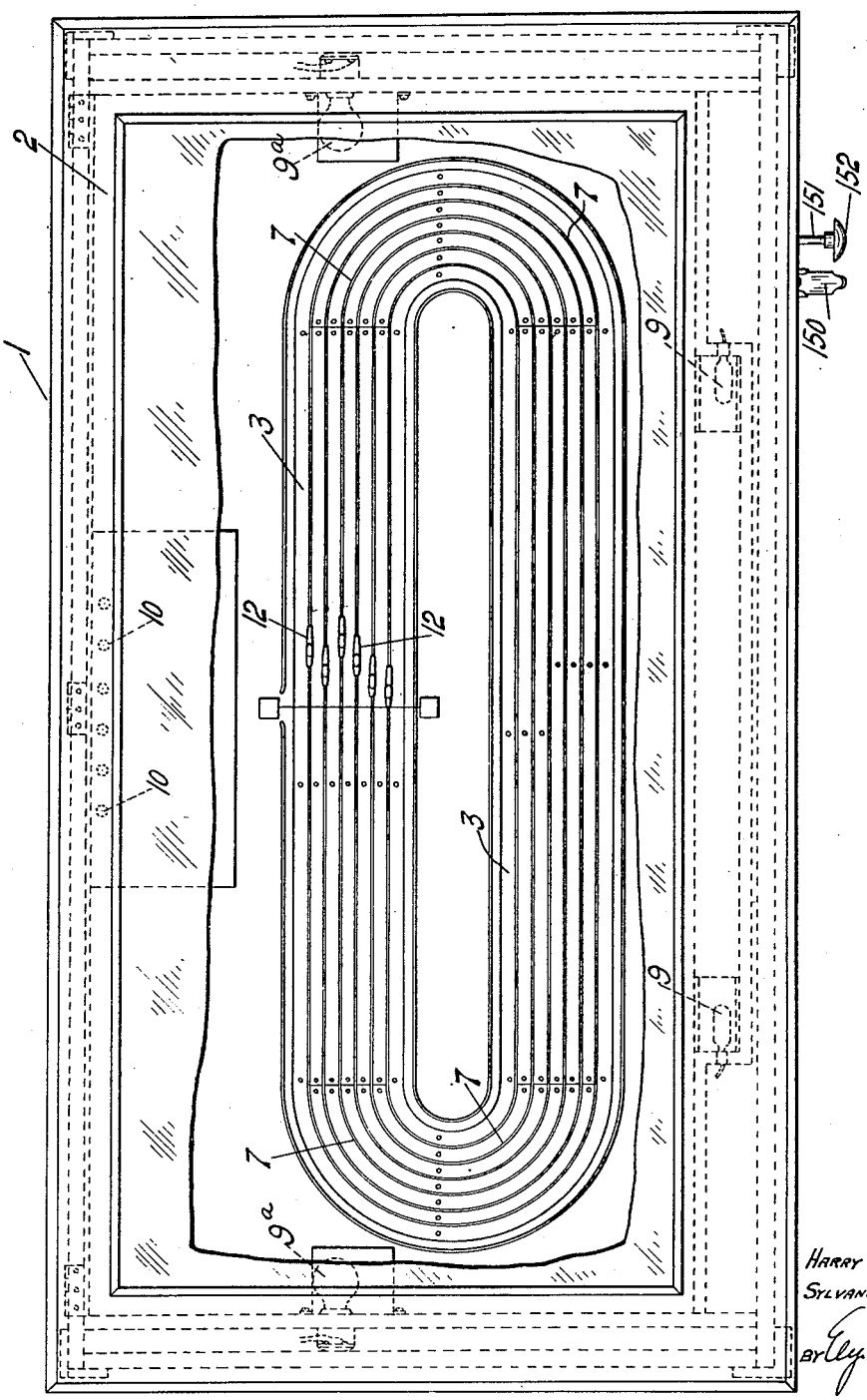
Figure 1 is a plan view of the track with the horses at the finish of the race as described, the glass case which is over the track being broken away as shown.
Figure 8:
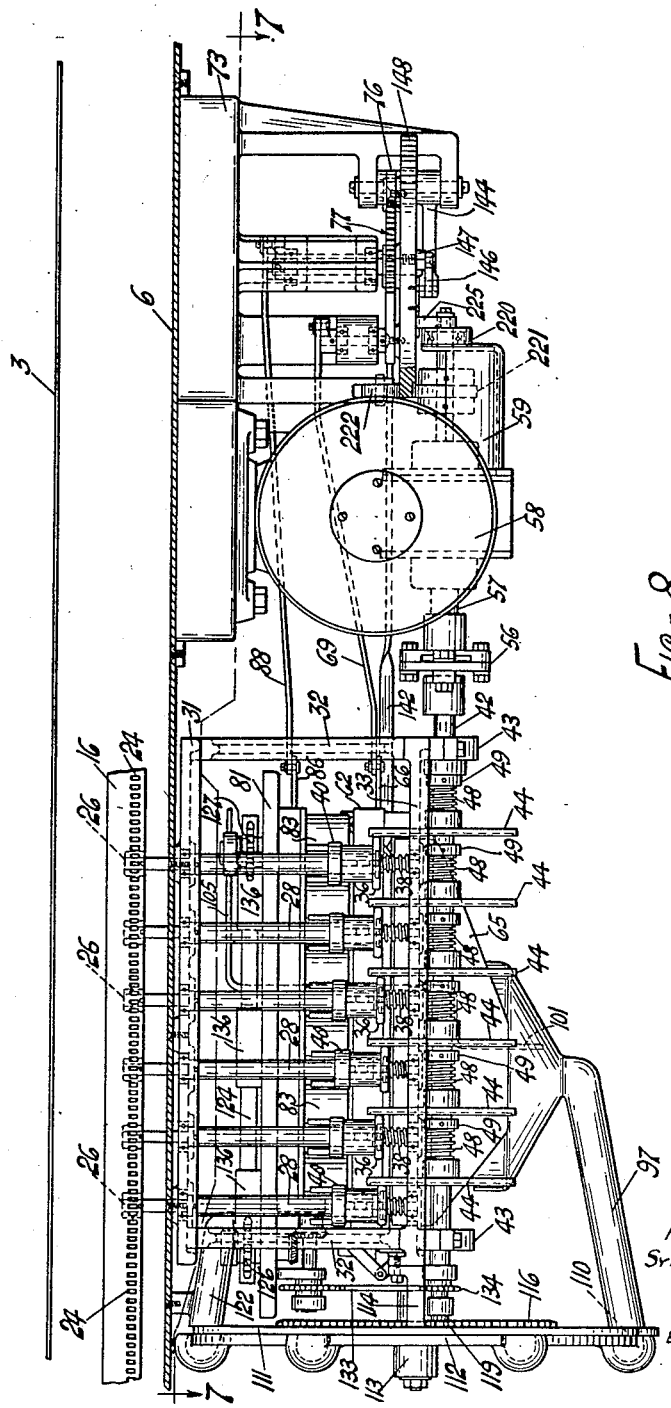
Figure 8 is an elevation of the parts shown in Figure 7 omitting the coin control device. The view is taken on the line 8—8 of Figure 7.
Figure 10:
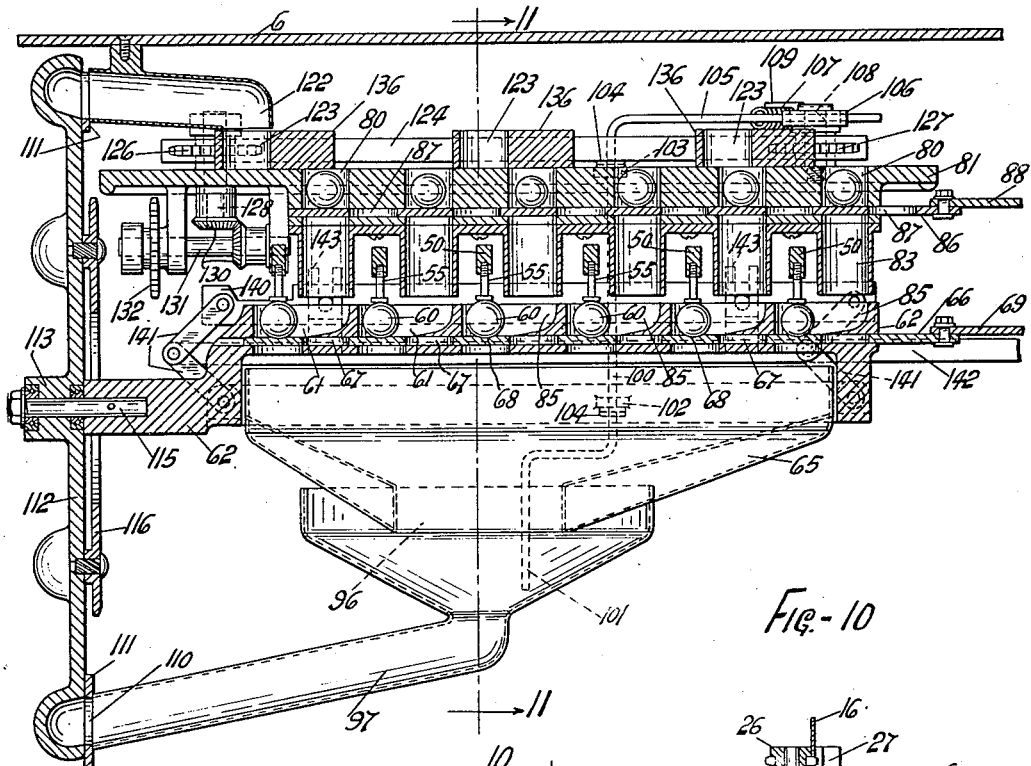
Figure 10 is a cross-section through the ball holding and releasing mechanism, the view being taken on the line 10—10 of Figure 11.

Referring particularly to Figure 10, the several balls are shown in the position they occupy at the end of the race depicted in Figure 1, the several levers controlling the horses being arranged from 1 to 6 beginning at the right. Thus the smallest ball, and, therefore, the one by which its particular driven pulley 36 was located at the outermost position on the disk 44, is shown at the right and the balls according to size are located in the same order as the horses as shown in Figure 1 and the disks as shown in Figure 8. The diameters of the balls as shown, reading from right to left, are 33/64; 34/64; 36/64; 38/64; 35/64; and 37/64.

The upper set of balls in the ready position is arranged in a totally different order as to size, 37/64; 35/64; 38/64; 33/64; 34/64; and 36/64, which means that the horses in the next race will finish in the following order: 4, 5, 2, 6, 1 and 3.

The lower set of balls are located in six pockets 61 beneath the feet 55, these pockets being formed in a stationary bar 62 supported by arms 63 from the bracket 30. These pockets are located over and discharge by gravity into an elongated hopper 65 suspended beneath the bar. The balls 60 rest in sockets upon a slide or shutter 66 movable in guideways in the bar 62 and provided with holes 67 adapted to register with the pockets to discharge the balls as described. The solid or closed positions of the shutter are formed with depression or sockets 68 to center the balls accurately beneath the feet 55. The slide is moved to bring the holes 67 into register with the pockets by a bar 69 which is connected at the opposite end to a crank pin 70 on a crank 71 on the upper end of a vertical shaft 72 at the starting mechanism. This crank is mounted in a bracket 73 suspended from the bed 6. The lower end of the shaft 72 has a Geneva gear 75 adapted to mesh with a large Geneva gear 76 having a set of teeth 77 adapted to operate the release shutter at the beginning of the operation of the machine, which will be described in conjunction with the description of the starting mechanism (Figures 13 and 14).

The set of balls in the ready position are located in a series of pockets 80 formed in a plate 81 also supported on the bracket 30 above the bar 62. These pockets discharge through tubes 83 into curved extensions 85 of the pockets 61 from where the balls roll into the sockets on the shutter 66. The balls in the pockets 80 are held in position by a shutter 86 slidably mounted in the plate 81 and having holes 87 adapted to be brought into register with the tubes 83 to discharge the balls. The shutter 86 is actuated by a bar 88 which is connected at its opposite end to a crank 89 on the crank shaft 90 located in the bracket 73 at one side of the shaft 72. The lower end of the shaft 90 carries the Geneva gear 91 which also contacts and meshes with the large Geneva gear 76. As the gear 76 rotates in the direction of the arrow in Figure 13, it will be seen that the lower shutter 66 is opened and closed, discharging the lower set of balls just before the upper shutter is opened and closed discharging the upper or ready set of balls into the pockets in the lower bar.

The mixing and distribution of the balls as they leave the lower bar will now be described.

Figure 7:
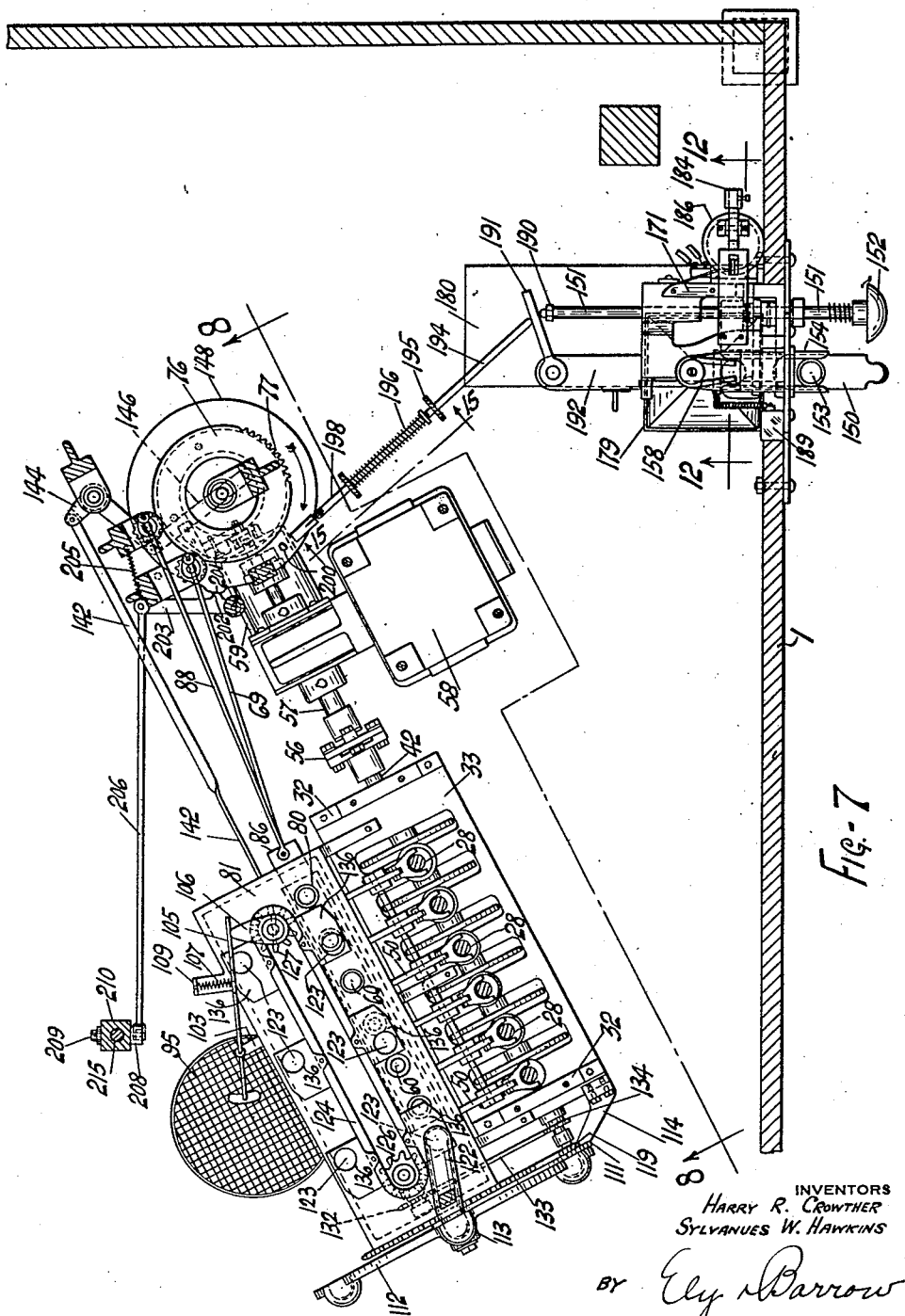
Figure 7 is a plan view of the mechanism beneath the tapes or belts showing the coin control device, the starting mechanism, the speed control device and other parts associated with the working of the apparatus. This view is taken on the line 7—7 of Figure 8.

The balls 60 as they are released from the pockets at the start of a race fall into the hopper 65 previously described, which is covered by a wire netting 95. The mouth of the hopper is indicated at 96 and discharges into the flared end of a chute 97 down which the balls pass. As the balls drop into the hopper by gravity, the order in which they pass into the chute will be subject entirely to chance, jamming will be prevented and the possibility of variations and changes in that order are increased by means of a stirrer or "jiggler" located in the mouth 96, which stirrer will interrupt or retard the passage of certain of the balls so that the arrangement is indiscriminate. This stirrer comprises a rod 100 having an offset lower end 101 which oscillates across the mouth 96, the netting 95 being broken away as shown in Figure 7 for permitting the movement of the stirrer. The central portion of the stirrer is pivotally mounted in two bearing members, 102 extending from the bar 62, and 103 extending from the plate 81, collars 104 preventing vertical movement of the stirrer. The upper end of the stirrer is extended horizontally as at 105 over the top of plate 81 and is located in the path of a cam 106 which is secured to the stub shaft 108 which is in engagement with the distributor-conveyor, to be described. A spring 107 carried on a bracket 109 extending from the plate 81 holds the extension 105 in contact with the cam. By the mechanism described, the balls are stirred up in the hopper before they pass into the elevating and distributing mechanism.

The lower end of the chute 97 discharges the balls as they pass in order down the chute through an opening 110 in a circular guard ring 111 which is supported on a bracket 114 attached to the plate 33 and which extends over pockets in an elevating spider 112. This spider consists of a number of arms extending from a central hub 113 which is rotatably mounted on a spindle 115 supported on the bar 62. The ends of the arms are provided with pockets of the size to receive a single ball from the chute 97, the balls being discharged at the upper point in the travel of the spider, the guard ring being removed at this point. The elevator 112 is rotated through a sprocket 116 attached to the rear face of the spider and driven by a chain 118 from a sprocket pinion 119 on the shaft 42.

As the balls leave the elevator, they are discharged through a tube 122 into the pockets 123 of a distributor-conveyor which deposits them in the pockets 80 into "ready" position. This conveyor consists of a chain 124 which is trained over the driven sprocket 126 and the idler sprocket 127 mounted upon the shaft 108 which carries the cam 106 previously referred to. The former sprocket is connected to a shaft 128 which is, in turn, connected by bevel gearing 130 to a shaft 131 supported in bearings depending from the plate 81 and driven by a sprocket 132 over which is trained the sprocket chain 133 driven by sprocket 134 on the shaft 42.

On the chain 124 are carried six blocks 136 which are provided with the pockets 123 referred to and which are moved under the tube 122 in proper timed relation to receive the several balls as they are deposited by the elevator. As the pockets 123 move over the pockets 80 the balls will fill the set of pockets from left to right, for as each pocket 80 is filled the conveyor will carry the balls into the next pocket until the full complement of balls is in proper position in the upper plate resting upon the shutter 86.

It will be apparent that before the balls can enter the lower pockets the arms 50 must be raised so as to elevate the feet 55 and permit the balls to pass under the feet and then the arms must be lowered, this action taking place before the barrier is released. For this purpose the ends of the arms 50 are extended rearwardly of the feet 55 and overlie a horizontal lifting bar 140 which extends across the series of pockets. The bar 140 is guided in forks 143 and is connected at its ends to toggles 141 pivoted to the lower bar. The pivots are connected to the link 142 which extends to the starting disk and is connected at the far end to the short arm of a bell crank 144 pivoted at 145 on the bracket 73. The long arm of the bell crank is connected by link 146 to a pin 147 on the under side of the starting disk 148 which is fastened to the under side of the Geneva gear 76.

Figure 11:
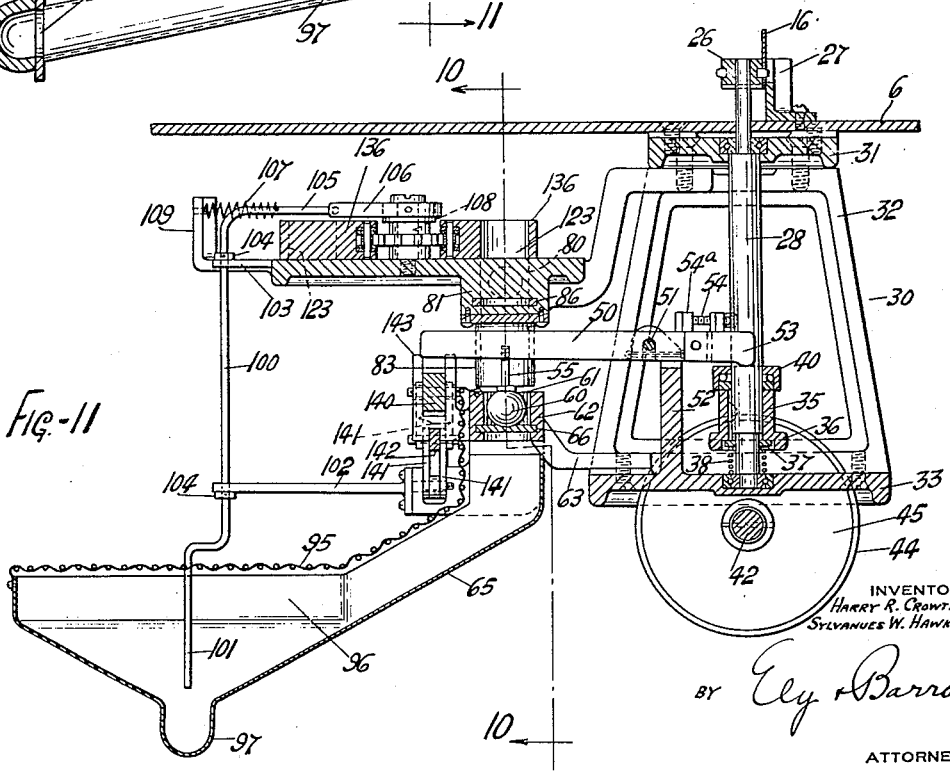
Figure 11 is a section on the line 11—11 of Figure 10 showing the position of a ball with relation to the drive mechanism.

In the position of the parts shown in Figure 13, both the upper and lower shutters are closed and the lifting bar is in the lowermost position shown in Figures 10 and 11. The disk 148 with the gear 76 is designed to be rotated in the direction of the arrow in Figure 13 a single complete revolution at the commencement of the race. The lifting bar is raised and lowered by the operation of the link 146 and while the bar is raised and the arms 50 consequently lifted so that the feet 55 are out of the way, the lower shutter is opened and closed by the engagement of the gear segment 77 with the gear 75 and the lower set of balls is released to the mixing device. The gear 77 now engages the gear 91 and the upper shutter 86 is opened, depositing the upper set of balls beneath the feet 55, and then closed to receive the first set of balls as they are subsequently delivered by the elevator. The continued operation of the arm 142 now lowers the feet 55 on the balls.

*Starting mechanism and barrier*

The starting device consists primarily of the disk 148 and the gear 76 connected therewith, which have been partially described in connection with the ball control mechanism.

The apparatus is set in operation by the deposit of a coin or slug in the machine through the slide 150 and the pressing in of a plunger 151 having a knob 152 on the end thereof, these parts being located outside of the cabinet. The coin slide 150 has a hole 153 therein in which the coin is deposited and by which it is moved over the guideway 154 until the coin is brought into register with the pocket 155 formed in the upper level 156ª of a plate 156 fixed to the inside front of the cabinet. To prevent the operation of the machine by a counterfeit slug, a magnet 158 is located over the pocket.

When the coin is deposited in the pocket 155, it rests upon a block 160 which is slidably supported by lugs 161 upon an elongated guiding pin 162 which is, in turn, supported on the plate 156. On the side of the block nearest the front of the cabinet is formed an extension 163 which is received over the rod 151 between collars 165 and 166 secured to the rod. A portion of the coin, however, projects over the block and rests upon the horizontal face of a pivoted latch lever 168 which is provided with a cam extension 169 which projects beside the coin, the pocket 155 being cut away to permit the movement of the cam extension across the under side of the plate 156.

The lever 168 is pivoted on the guiding pin 162 between the lugs 161 so that it will move with the block 160. The opposite end of the lever is extended horizontally and provided with a latching tail piece 170 which normally rests behind a stop plate 171 fastened on the lower level 156ᵇ of the plate 156. A spring 172 between the block 159 and the horizontal portion of the lever 168 normally holds the tail piece in depressed position, it being observed that the end of the tail piece is spaced somewhat in the normal position from the end of the stop plate so that a certain limited movement is allowed to the plunger 151, but unless the tail piece is raised such movement is stopped by the part 171 before the apparatus is set in motion.

The operation may be described briefly as follows:

If an attempt is made to force the plunger 151 inwardly when no coin is resting in the pocket 155, the partial movement permitted by the position of the stop plate 171 will not disturb the latch 168 and the machine will not be operated. If, however, a coin is resting in the pocket, the forward movement of the plunger will cause the cam-face 169 to press against the side of the coin and will raise the tail piece 170 above the stop plate and will also raise the main body of the lever in such position that on continued movement, the main body of the pivoted latch will ride upon the surface 175 of the lower plate level 156ᵇ until the side of the latch strikes the vertical face 176 on the plate, it being observed that the plate 156 is provided with the cut-out portions to permit the movement of the latch. A spring 178 is attached to the plunger rod 151 and to a stationary portion of the apparatus to return the parts to operative position. When the plunger is pressed inwardly and the parts 160 and 168 also moved inwardly from beneath the pocket, the coin will drop into a hopper 179 and into the money receptacle 180.

In case a coin should be inserted while a race was in progress and the plunger pressed inwardly, such action would upset the machine, and in order to prevent such tampering with the device a detent rod is provided, shown at 182, which is normally outside of the pocket, but which, when a race is in progress, is moved into the pocket so as to hold a coin in tilted position, as shown in dotted lines in Figure 12, until the race is over. In order to project the rod 182, its outer end rests against a lever 183 counterweighted at 184 and pivoted at 185 directly above a solenoid 186. The solenoid is in circuit with the operating motion so that when a race is in progress, the solenoid is energized, moving the arm 183 and projecting the detent rod into the path of the coin. When the race is over, the arm 183 is raised and the detent moved out by the spring 188, and the apparatus can function as normally. This is a safety device which prevents wilful tampering with the apparatus and also serves to hold the coin down on the block 160.

A register 189 is connected to the coin apparatus in any suitable manner, preferably so as to be operated by the coin slide, to record the number of operations of the device.

The plunger rod 151 slides in bearings in the plate 156 and is provided with an adjustable head 190 which rests against a pivoted operating arm 191 supported upon an extension 192 from the plate 156. The arm 191 contacts upon the opposite side with a reciprocable operating rod 194 which is directed toward the starting disk. The arm 194 is supported in bracket 195 depending from the deck 6 and is urged toward the arm 191 by a coil spring 196. The lower end of the arm 194 is provided with a pivoted operating dog 198 which rests upon the surface of the disk wheel 148 being yieldingly held by a spring 199. On the face of the disk wheel is the lug 200 which, when the machine is at rest, is spaced from the end of the dog 198 a sufficient distance so as to permit the slight inward movement of the plunger 151 when no coin is in position. When the plunger 151 is pressed to its inward position, the end of the dog strikes the lug 200 and moves the disk wheel a sufficient distance to set the parts in operation, as will be described.

Figure 16:
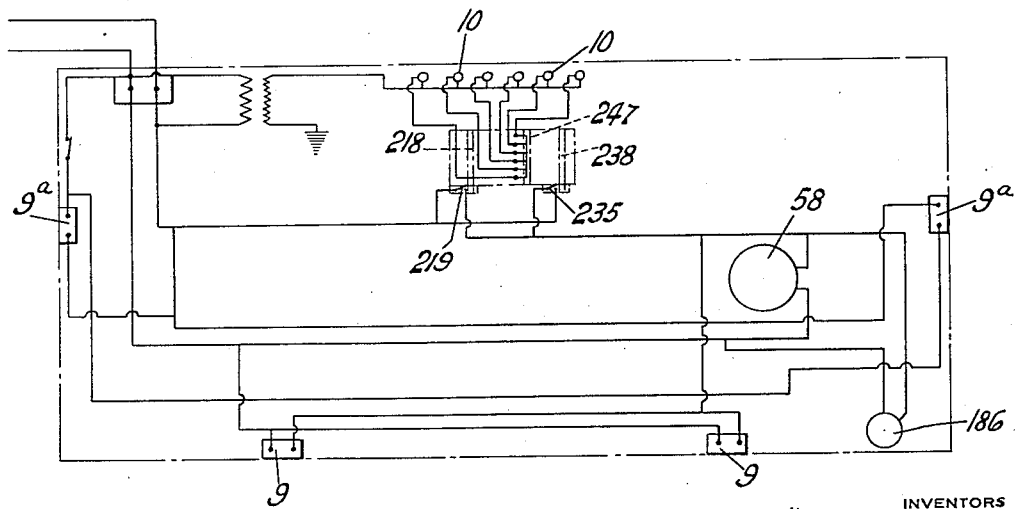
Figure 16 is a wiring diagram showing the position of the parts when idle.

On the edge of the disk wheel 148 is a lug or projecting cam 201 which, when the apparatus is idle, is in the position shown in Figure 13, where the cam 201 is in contact with the projection 202 on the lever 203 pivoted on the casting 73 at 204. The lever is urged toward the disk wheel by spring 205 and is limited in its movement by pin 207 which prevents projection 202 from riding around the edge of disk wheel 148. The free end of the lever is connected by the link 206 to a crank 208, the pin 209 of which is rotatably mounted in a box or bracket 210 located at the barrier. The pin 209 is provided with a recess 211 on one side thereof adapted to form a seat for a ball 212 movable in a cavity 213 in the bracket. When the apparatus is at rest with the cam surface 201 beneath the projection 202, the recess 211 is uppermost and the ball rests therein, as shown in Figure 3. When the disk wheel is started in rotation and the lever rocked by passage of the cam from beneath the lever, the shaft 209 is rocked, raising the ball 212. A plunger 215 rests upon the ball moving in the cavity 213, and directly over the plunger is the arm 216 which is moved by the spring 217 when the plunger is lowered. Arm 216 is fastened to a rock shaft 218 which carries the movable switch 219. As shown in Figure 16 when the switch 219 is raised and closed, the motor 58 is energized, driving the main shaft 57 and thus starting the tapes in motion through the disks 44 as has been described.

The shaft 57 is extended underneath the disk wheel 148, being supported in a bracket 220 from the motor housing. Under the edge of the disk wheel 148 is located the friction drive wheel 221 and over the drive wheel 221 is located in the hanger 73 the guiding and supporting wheel 222 which bears upon the upper surface of the disk in opposition to the wheel 221 and thus steadies the disk wheel. At the point where the disk wheel comes to rest, the under surface of the disk wheel is cut away as at 224 so that when the disk wheel has completed a single rotation and has performed all of its duties, it will come to point of rest while the race is being run. The period of operation of the disk wheel is measured by and equivalent to the period of elevation of the barrier as will be explained. The operation of the disk wheel by the plunger 151 not only closes the switch at the barrier so that the motor will operate, but also establishes the driving connection to the disk wheel. When the disk wheel completes its revolution, the barrier switch is opened by the operation of the cam 201 and at the same time the friction wheel 221 ceases to drive the disk wheel. The lug 200 also passes beneath the spring-held dog 198. As the gap 224 has to be made of sufficient extent to insure stoppage of the disk wheel, it is necessary to reset the disk wheel to the position shown in Figure 13. For this purpose a pusher or kicker is provided which will move the disk wheel to its set position. This consists of a pivoted pusher blade 225 on an eccentric pin 226 on the shaft 57. This blade is held against the under side of the disk wheel by a spring 228 and on the under side of the disk wheel is the abutment 229, one face of which is beveled as at 230. As the disk wheel approaches the point of rest, the abutment 229 will pass beneath the pusher 225 which on its forward stroke will move the disk wheel to the correct position.

Returning to the barrier switch, it will be observed that to the shaft 218 is attached the barrier 232 which is provided with slots to permit the passage of the tapes 16 but which extends in the path of the horse carriers, being formed with a vertical face or abutment 233 to engage and hold the horses. The period of time in which the barrier is raised, which is the period of revolution of the disk wheel is sufficient to permit all of the horses to move up to the barrier and be held in line, the tapes sliding through the friction surfaces on the carriers. When the rod 206 is actuated by the passage of the cam 201, the barrier drops and the horses move off simultaneously.

During the running of the race, the current is passed to the motor by means of the finish switch, that is, the switch located at the finish line. This is indicated by the movable switch member 235 which is normally held against the stationary contact 236 by the spring 237. The switch 235 is secured to the rock shaft 238 which extends across the track and to which is attached the finish line 239 in the form of a plate extending between the tapes 16 and in the path of the carriers 14. As soon as all of the horses pass over the finish line and move up to the barrier, the switch 235 will be closed by the action of the spring 237 and this switch will remain closed until the first horse reaches the finish line, i. e., the plate 239, which is depressed, thereby opening all circuits and stopping the motor. In order to hold the carriers on the tapes, so that they will properly depress the finish switch and be held by the barrier, guide rails 240 supported on brackets 241 on the bed 6 are provided over the two switches which project over the top of the carriers 14 as shown in Figure 6. The position of the winning horse and the manner in which the carriage for that horse opens the finish switch and stops the race is shown in Figure 3.

In order to indicate unmistakably the winner of the race, the lights 10 are individually connected to contacts 245 carried upon arms 246 extending from a rock shaft 247 located in a plate 248 on the bed 6. The arms 246 are normally held in upright position in the path of the several horses by the spring 249 which holds the arm assembly against a stop pin 250. The first horse to reach the finish line will depress the arms so that the contact 245 touches the lower forward corner of the carriage which completes the particular light circuit through the body of the carrier, the arm 239 and the frame of the machine which is grounded as shown in Figure 16, lighting the appropriate light 10.

It will be observed from Figure 16 that the cabinet lights 9 and the solenoid 186 are all energized by the current when the motor is operating.

The operation

The operation as viewed by the player may be briefly summarized. The cabinet is lighted by lamps 9a and the horses are located in the position in which they were left at the conclusion of the previous race. The player inserts a coin in the slide 150 and presses the slide which deposits the coin in the pocket 155. He then presses in the plunger 151, the motor starts and the cabinet lights 9 are lighted. The horses move forward to the barrier where they all line up across the track, sufficient time elapsing so that the rearmost horse takes his proper position abreast the others. The horses then start off simultaneously on the course, passing and repassing in what is apparently indiscriminate order. As the horses round the far turn in the track and approach the finish line, one horse will outdistance the rivals and all the horses will stop just as the leading horse reaches the line. Just before the end of the race the light for the winning horse will flash on and remain on until the horses leave the finish line to start the next race. Cabinet lamps 9 will go out at the end of the race due to the stopping of the motor.

What occurs inside the cabinet will be reviewed. When the plunger is pressed in, the cam face 169, acting against the coin, will release the latch 170 and the two slides 160 and 168 will move forward to the end of the slot against the face 176 and the coin will drop into the coin box. The forward movement of the plunger 151 will, through the operating rod 194, move the disk wheel so that the barrier switch will close. This completes the circuit which operates the cabinet lights 9 and will start the motor which, through the pulley 221, drives the under side of the disk wheel. The motor will drive the several tapes 16 and will carry all of the horses over the finish switch to the barrier where they will be held by the abutment 233. The forward movement of the horses closes the finish switch through which the current to the motor is maintained during the race. When the disk wheel has made one revolution, the cam 201 will come into play and will lower the barrier and open the barrier switch so that the horses move forward.

During the rotation of the disk wheel, the set of balls 60 which controlled the previous race are released to the mixer and elevated to their new position while the second or upper set of balls have been released and will enter the pockets in the lower bar beneath the feet 55. The arms 50 will then be lowered and the disks 36 assume their new positions as dictated by the arrangement of the balls. As the barrier is lowered, the tapes 16 move the horses about the track in accordance with the speed at which they are driven.

As has been explained, the difference in length of travel of the horses is compensated for so that the winner is determined solely by the position of the balls in the bar 62. As the horses reach the finish switch, the circuit is opened and the race stops.

While the description of the apparatus and the mechanism has been given in considerable detail in order that the invention may be made clear, it will be understood and appreciated that modifications and improvements may be made fully within the scope of the invention. The best known embodiment of the invention has been set forth, but this does not confine the inventor to the details as set forth, nor does it deprive the invention of such equivalents as may be designed.

What is claimed is:

1. In a device of the character described, the combination of a plurality of objects movable along a course, means for moving said objects in steady progression at equivalent basic speeds, and means to vary the basic speeds comprising a plurality of control devices of differing effective power and a mixing device to disarrange said control devices for each operation of the apparatus.

2. In a device of the character described, the combination of a plurality of objects movable along a course, means for moving said objects in steady progression at equivalent basic speeds, and means to vary the basic speeds comprising a plurality of control devices equal to the number of objects, one of said control devices having an effective power to move one of the objects at a greater increment than the remainder, and means for placing said control device in varying operating positions with respect to the actuating mechanism for said objects, said last-mentioned means being subject to chance only.

3. In a device of the character described, a plurality of horses or the like movable over a course, belts for carrying the horses about the course, a common driving means for said belts, shiftable speed altering mechanism in said driving means, a plurality of control devices movable into and out of operative position with respect to said speed altering mechanism, and means operable by the mechanism to alter the position of the control devices with respect to the speed altering mechanism.

4. In a device of the character described, a plurality of horses movable over a course, means for carrying the horses over the course, driving means for said carrying means including speed altering mechanisms, a number of speed control devices of different effective power movable in position to control the speed altering mechanisms, and means operating upon said control devices during their movement to and from operative position to change the order thereof indiscriminately.

5. In a device of the character set forth, a plurality of horses movable over a course, belts for carrying the horses about the course, individual driving means for said belts, a common operating shaft for said driving means, speed varying connections between the shaft and the several driving means, a set of balls of differing diameters movable into operative position with respect to the speed varying connections, and means to place said balls in operative position in indiscriminate order.

6. In a device of the character set forth, a plurality of horses movable over a course, belts for carrying the horses about the course, individual driving means for said belts, a common operating shaft for said driving means, speed varying connections between the shaft and the several driving means, two sets of balls, each set comprising balls of differing diameters, one set being located in control position with respect to said speed varying connections during a single operation of the apparatus, and means to mix each set indiscriminately and place it in position to move into operative position for the next operation of the apparatus.

7. A device as described in claim 5, in which the speed varying connections consists of shiftable driven pulleys in contact with drive pulleys on the shaft, the balls controlling the distance of the several driven pulleys with respect to the shaft.

8. A device as described in claim 6, in which the speed varying connections consist of shiftable driven pulleys in contact with drive pulleys on the shaft, the balls controlling the distance of the several driven pulleys with respect to the shaft.

9. In a device of the class described, a plurality of objects which in a position of rest are at different distances from a finish line, a barrier, means for moving the objects to the barrier where they are in alignment, means for releasing the barrier, and means for moving the objects about a course at varying speeds.

10. In a device of the class described, a plurality of objects which in a position of rest are at different distances from a finish line, a barrier, means for moving the objects to the barrier where they are in alignment, means for releasing the barrier, means for moving the objects about a course at varying speeds, and speed control devices for altering the speed of the several objects for separate operations.

11. In a device of the class described, a plurality of objects which in a position of rest are at different distances from a finish line, a barrier, means for moving the objects to the barrier where they are in alignment, means for releasing the barrier, means for moving the objects about a course at varying speeds, speed control devices of differing effective power for altering the speed of the several objects for separate operations, means for mixing the speed control devices indiscriminately, and means for bringing the speed control devices into operative position with respect to the object moving means of the several objects.

12. In a device of the class described, a plurality of belts, means for driving the belts at equivalent basic speeds, a plurality of object carriers in frictional contact with the belts, a barrier across the belts, means for moving the carriers to the barrier, means for releasing the barrier after a sufficient interval to permit the carriers to move into alignment, and means for varying the basic speeds.

13. In a device of the class described, a plurality of belts, means for driving the belts at equivalent basic speeds, a plurality of object carriers in frictional contact with the belts, a barrier across the belts, means for moving the carriers to the barrier, means for releasing the barrier after a sufficient interval to permit the carriers to move into alignment, and means for varying the basic speeds, said means comprising a plurality of speed control devices equal to the number of carriers and of differing effective power and a mixing device operable for each operation of the device for mixing the control devices indiscriminately.

14. In a game device, the combination of a track, a plurality of objects movable over the track at equivalent basic speeds, and means for varying the basic speeds of the objects out of control of the operator, said device including a set of balls of varying sizes, means for mixing the balls after each operation for which they have been effective and for delivering and holding the balls in position to assume a rearranged order for a succeeding operation.

15. In a game device, the combination of a track, a plurality of objects movable over the track at equivalent basic speeds, and means for varying the basic speeds of the objects out of control of the operator, said device including two sets of balls of varying sizes, one set being in position during one operation and a second set in position for the next operation, and means for exchanging the sets of balls and mixing them during exchange.

16. In a game device, the combination of a track, a plurality of movable objects which in a position of rest are unaligned at one portion of the track, means for moving the objects into alignment across the tract means for moving the objects from aligned position over the track at equivalent basic speeds, and means for varying the basic speeds for each operation indiscriminately.

17. In a game device, the combination of a track, a plurality of objects which are in one position of rest at one portion of the track, and a single device to perform the following operations in sequence: move the objects forward to a position in alignment across the track, hold the objects in alignment for an interval, release the objects, and then cause the objects to move over the track at different speeds.

18. In a game device, the combination of a track, a plurality of objects which are in one position of rest at one portion of the track, a single device to perform the following operations in sequence: move the objects forward to a position in alignment across the track, hold the objects in alignment for an interval, release the objects, and then cause the objects to move over the track at different speeds, and means for altering the speed of the objects operative by chance.

19. In a device of the character described, a plurality of sets of balls, the balls in each set being of different sizes, a plurality of movable objects, means for controlling the speed of the objects actuated by the balls of one set while another set is held in position, and means to replace the first named set with the other set.

20. In a device of the character described, a plurality of sets of balls, the balls in each set being of different sizes, a plurality of movable objects, means for controlling the speed of the objects actuated by the balls of one set while another set is held in position, means to replace the first named set with the other set, and means to mix the balls of a set indiscriminately before placing them in position.

21. In a device of the character described, a set of control devices, a plurality of movable objects, means for controlling the speed of the objects actuated by the set of control devices, one of said devices in a set being proportioned so as to cause the object which it controls to move faster than the other objects, and means for placing that device in an operative position with any of the objects indiscriminately.

22. In a device of the character described, a set of control devices, a plurality of movable objects, means for controlling the speed of the objects actuated by the set of control devices, one of said devices in a set being proportioned so as to cause the object which it controls to move faster than the other objects, and means for mixing the control devices so that the specific device named will pass into operative position with respect to any one of the objects.

23. In a device of the character described, a plurality of movable objects, means for moving the objects, said means containing speed varying mechanism for each object, a set of control devices equal in number to the objects, one member of each set being proportioned so as to cause its object to move faster than the others, and means operated wholly by chance to cause the set to move into varying operative positions with respect to the speed varying mechanisms.

24. In a device of the character described, a course, a plurality of objects movable over the course, means to drive the objects, speed changing devices equal to the number of objects, and speed control devices of the same number movable into operative engagement with the individual speed changing devices.

25. In a device of the character described, a course, a plurality of objects movable over the course, means to drive the objects, speed changing devices equal to the number of objects, and speed control devices of the same number movable into operative engagement with the individual speed changing devices, the speed control devices being of different effective powers.

26. In a device of the character described, a course, a plurality of objects movable over the course, means to drive the objects, speed changing devices equal to the number of objects, speed control devices of the same number movable into operative engagement with the individual speed changing devices, the speed control devices being of different effective powers, and means to distribute the control devices indiscriminately with respect to the speed changing devices.

27. In a device of the character described, a course, a barrier across the course, a plurality of objects movable to the barrier, means to release the barrier after the objects are in alignment, means to move the objects over the course after the barrier has been released, speed changing devices in each of the object moving means, a set of speed control devices of differing effective value movable into operative relation to the object moving means to effect variations in speed of the objects, and chance controlled means to mix the speed control devices before they are moved into operative position.

28. In a device of the character described, a course, a barrier across the course, a plurality of objects movable to the barrier, means to release the barrier after the objects are in alignment, means to move the objects over the course after the barrier has been released, speed changing devices in each of the object moving means, a plurality of sets of speed control devices, each set containing devices of differing effective value, and means to place the sets in rotation in operative position with respect to the object moving means.

29. In a device of the character described, a course, a barrier across the course, a plurality of objects movable to the barrier, means to release the barrier after the objects are in alignment, means to move the objects over the course after the barrier has been released, speed changing devices in each of the object moving means, a plurality of sets of speed control devices, each set containing devices of differing effective value, means to place the sets in rotation in operative position with respect to the object moving means, and means to mix each set of control devices during its passage from and to operative position.

30. In a device of the character described, a plurality of driving belts, an object on each driving belt having frictional contact therewith, a barrier movable into the path of the objects, means to drive all the belts, and means after an interval of belt movement to release the barrier and permit all of the objects held thereby to move forward with the belts.

31. In a device of the character described, a plurality of driving belts, an object on each driving belt having frictional contact therewith, a barrier movable into the path of the objects, means to drive the belts at different speeds, and means after an interval of belt movement to release the barrier and permit all of the objects held thereby to move forward with the belts.

32. In a device of the character described, a plurality of driving belts, an object on each driving belt having frictional contact therewith, a barrier movable into the path of the objects, means to drive the belts at different speeds, means after an interval of belt movement to release the barrier and permit all of the objects held thereby to move forward with the belts, and chance controlled devices to alter the speeds of the several belts in the successive operations of the device.

HARRY R. CROWTHER.
SYLVANUES W. HAWKINS.